United States Patent
Ang et al.

(10) Patent No.: US 12,098,630 B2
(45) Date of Patent: Sep. 24, 2024

(54) MOVEMENT NOISE SUPPRESSION IN A MOVING ARRAY FOR DOWNHOLE LEAKAGE LOCALIZATION

(71) Applicant: HALLIBURTON ENERGY SERVICES, INC., Houston, TX (US)

(72) Inventors: Yi Yang Ang, Singapore (SG); Yao Ge, Singapore (SG)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 353 days.

(21) Appl. No.: 16/781,573

(22) Filed: Feb. 4, 2020

(65) Prior Publication Data

US 2021/0238989 A1  Aug. 5, 2021

(51) Int. Cl.
*E21B 47/107* (2012.01)
*G01M 3/24* (2006.01)
*E21B 47/12* (2012.01)
*G01V 1/50* (2006.01)

(52) U.S. Cl.
CPC .......... *E21B 47/107* (2020.05); *G01M 3/243* (2013.01); *E21B 47/12* (2013.01); *G01V 1/50* (2013.01)

(58) Field of Classification Search
CPC .......... G01V 1/50; G01V 1/48; E21B 47/107; G01M 3/243
See application file for complete search history.

(56) References Cited

U.S. PATENT DOCUMENTS

| | | | |
|---|---|---|---|
| 6,470,275 B1 | 10/2002 | Dubinsky | |
| 9,115,568 B2 * | 8/2015 | Han | E21B 47/01 |
| 9,982,527 B2 | 5/2018 | Zhao et al. | |
| 2010/0228530 A1 | 9/2010 | Valero et al. | |
| 2017/0321540 A1 | 11/2017 | Lu et al. | |
| 2018/0010443 A1 * | 1/2018 | Lu | E21B 49/08 |
| 2018/0112523 A1 | 4/2018 | Yang et al. | |
| 2018/0149019 A1 * | 5/2018 | Bose | G01V 1/44 |
| 2018/0217021 A1 | 8/2018 | Lu et al. | |

(Continued)

FOREIGN PATENT DOCUMENTS

| | | |
|---|---|---|
| WO | 1999058816 A1 | 11/1999 |
| WO | 2018013049 A2 | 1/2018 |
| WO | 2018178279 A1 | 10/2018 |

OTHER PUBLICATIONS

International Search Report and Written Opinion for International application No. PCT/US2020/024070, mailed Oct. 30, 2020, 11 pages.

(Continued)

*Primary Examiner* — Kipp C Wallace
(74) *Attorney, Agent, or Firm* — NOVAK DRUCE CARROLL LLP

(57) ABSTRACT

The disclosed technology provides ways to suppress or eliminate the effects of roadnoise when performing acoustic leak detection in a wellbore environment. In some aspects, a method of the technology includes steps for receiving acoustic training data, wherein the acoustic training data comprises signals representing acoustic tool contact with a wellbore surface, and generating a suppression model based on the acoustic training data, wherein the suppression model is configured to suppress roadnoise received at a hydrophone array disposed within the wellbore. Systems and machine-readable media are also provided.

11 Claims, 13 Drawing Sheets

(56) References Cited

U.S. PATENT DOCUMENTS

| 2018/0252611 | A1* | 9/2018 | Cole | G01M 3/243 |
| 2018/0258756 | A1* | 9/2018 | Nguyen | G01V 1/46 |
| 2018/0283167 | A1* | 10/2018 | Ang | E21B 47/10 |
| 2018/0371897 | A1* | 12/2018 | Ang | G01V 11/002 |
| 2019/0203585 | A1* | 7/2019 | Nguyen | G01V 1/42 |
| 2019/0219716 | A1* | 7/2019 | O'Toole | G01V 1/288 |
| 2020/0143139 | A1* | 5/2020 | Mena Paz | G06N 3/08 |
| 2020/0256834 | A1* | 8/2020 | Langnes | E21B 47/10 |
| 2020/0284937 | A1* | 9/2020 | Zhang | G01V 1/42 |

OTHER PUBLICATIONS

Abstract of Yang, Qinshan et al., "Downhole Leak Detection: Introducing a New Wireline Array Noise Tool", Society of Petroleum Engineers; SPE/ICoTA Well Intervention Conference and Exhibition, Mar. 26-27, The Woodlands, Texas, USA; SPE-194264-MS; Mar. 2019.

Abstract of Julian, Jennifer Yvonne et al., "Detecting Ultrasmall Leaks with Ultrasonic Leak Detection, Case Histories from the North Slope, Alaska", Society of Petroleum Engineers, International Oil Conference and Exhibition in Mexico, Jun. 27-30, Veracruz, Mexico; Jun. 2007.

Abstract of Julian, J.Y et al., "Identifying Small Leaks with Ultrasonic Leak Detection-Lessons Learned in Alaska", Society of Petroleum Engineers, SPE Annual Technical Conference and Exhibition, 3Sep. 30-Oct. 2, New Orleans, Louisiana, USA, SPE-166418-MS; Oct. 2013.

Aditama, Prihandono et al., " Evaluation of a Passice Ultrasonic Log Application for Casing Integrity Assessment: A Case Study in a South Oman Field", Society of Petroleum Engineers, SPE Asia Pacific Oil and Gas Conference and Exhibition, Oct. 22-24, Perth, Australia; SPE-158575-MS; Oct. 2012.

\* cited by examiner (a) Maximum Beamformer Power WITH Suppression across the depth (a) Maximum Beamformer Power without Suppression across the depth

MOVEMENT NOISE SUPPRESSION IN A MOVING ARRAY FOR DOWNHOLE LEAKAGE LOCALIZATION

TECHNICAL FIELD

The present disclosure pertains to formation evaluation and in particular, to the analysis of acoustic data to detect and locate leaks in a wellbore formation.

BACKGROUND

Wellbores are typically drilled proximate to subterranean hydrocarbon deposits to facilitate exploration and hydrocarbon production. Casing sections are often coupled together to extend an overall length of the casing (e.g., production casing, an intermediate casing, or a surface casing) that is deployed in the wellbore to insulate downhole tools and strings deployed in the casing as well as hydrocarbon resources flowing through the casing from the surrounding formation, to prevent cave-ins, and/or to prevent contamination of the surrounding formation. A cement job is usually performed to fixedly secure the casing to the wellbore and to form a barrier that isolates different zones of the wellbore. Over time, the casing and/or the cement sheath may weaken, and one or more leaks may form at different sections of the casing and/or cement sheath. Reservoir fluids that were previously isolated from the casing or from sections of the casing by the cement sheath may leak through the sheath and may affect well integrity jeopardizing production.

Sensors are sometimes deployed downhole to facilitate leak monitoring. For example, sensors are sometimes mixed with cement and are fixedly deployed along the cement. Although stationary sensors can be utilized to detect leaks, sometimes the stationary sensors are not deployed proximate to the leaks, and thereby do not provide accurate information regarding the leak locations. As such, sensor arrays are sometimes deployed along the production tubing, which extends down the wellbore. One or more sensors of the sensor array can be positioned proximate to the leak and thereby may be operable to detect the leak. Measurements made by different sensors of the sensor array may also be compared to obtain more accurate information regarding the leak.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One challenge faced when using acoustic tools to perform leak detection is that the acoustic analysis is confounded by stray sound signals in the wellbore. In particular, leak detection can be confounded by noise artifacts generated by the acoustic tool when the tool drags against the wellbore surface (i.e., "roadnoise"). To improve leak detection, it would be helpful to eliminate roadnoise before analysis is performed on received acoustic signals.

Aspects of the disclosed technology address the foregoing limitations of acoustic leak detection by providing systems and methods for eliminating (suppressing) roadnoise. As discussed in further detail below, roadnoise suppression can be accomplished using a roadnoise suppression model that can be used to adjust beamformer weights in a manner that attenuates noise in the received acoustic signals. As used herein, roadnoise can refer to any acoustic waves that constitute signal noise in the leak detection process. For example, roadnoise can result from sounds generated by movements of a downhole tool, such as tool contact with an interior surface of the wellbore. As used herein, roadnoise can encompass sounds generated from downward movement of a logging tool (e.g., during down-logging operation) and/or during upward movement of the logging tool (e.g., during up-logging operation). Additionally, roadnoise may include other types of non-leakage noise signals in the wellbore, such as those result from acoustic waves propagating along the wall of the wellbore, (e.g., Stoneley waves) produced from wellbore leaks.

Figure 1A:
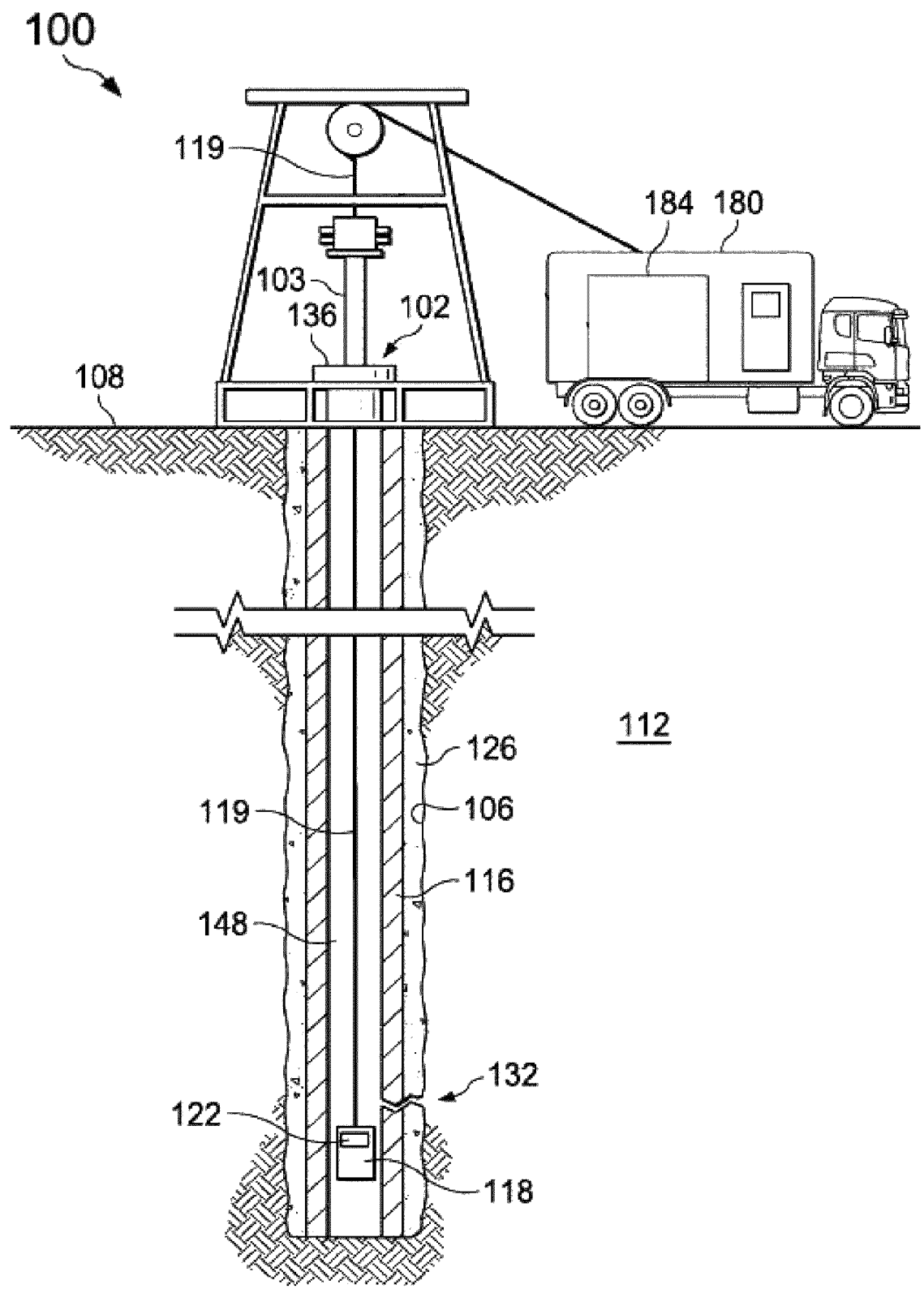
FIG. 1A is a schematic side-view of a wireline logging environment in which a leak detector is deployed in the wellbore.

Turning now to the figures, FIG. 1A is a schematic, side view of a logging environment 100 in which a leak detector 118 having a physical sensor 122 operable to detect leaks along wellbore 106 is deployed on conveyance 119 in wellbore 106. As used herein, conveyance 119 can include different conveyance types, including but not limited to wirelines, slicklines, coiled tubing, downhole trackers, or the like. Additionally, depending on the implementation, conveyance 119 may be configured to provide power to a downhole tool and/or various telemetry systems.

In the embodiment of FIG. 1, a well 102 having wellbore 106 extends from a surface 108 of well 102 to or through subterranean formation 112. Casing 116 is deployed along wellbore 106 to insulate downhole tools and strings deployed in casing 116, for example, to provide a path for hydrocarbon resources to be extracted from subterranean formation 112, and to prevent cave-ins, and/or contamination of subterranean formation 112. Casing 116 is normally surrounded by a cement sheath 126, which is deposited in an annulus between casing 116 and wellbore 106 to fixedly secure casing 116 to wellbore 106 and to form a barrier that isolates casing 116. Although not depicted, there may be layers of casing concentrically placed in wellbore 106, each having a layer of cement or the like deposited thereabout.

A vehicle 180 carrying wireline 119 is positioned proximate to well 102. The wireline 119 along with leak detector 118 and physical sensor 122 are lowered through blowout preventer 103 into well 102. Data indicative of measurements obtained by the physical sensor 122 and/or processed by the leak detector 118 may be transmitted via wireline 119 or another telemetry system to the surface 108 for processing by controller 184, or by various other electronic devices operable to process the data obtained by the physical sensor 122 and the leak detector 118. In the embodiment of FIG. 1A, controller 184 is stored on vehicle 180. In some embodiments, controller 184 may also be housed in a temporary and/or permanent facility (not shown) proximate well 102. In other embodiments, controller 184 may also be deployed at a remote location relative to well 102.

Figure 1B:
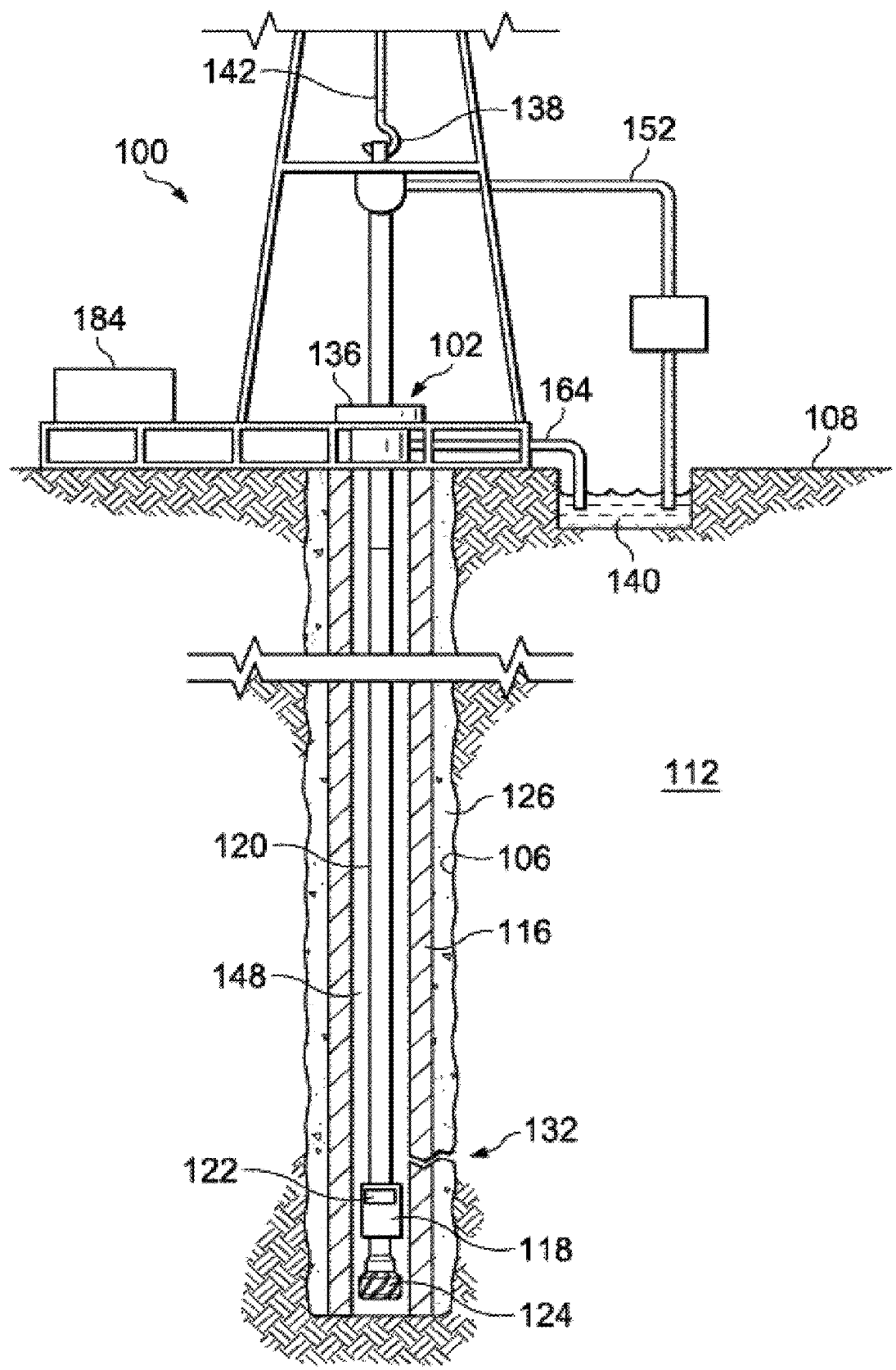
FIG. 1B is a schematic side-view of a (LWD) environment in which the leak detector of FIG. 1A is deployed in the wellbore to detect leaks along the wellbore.

FIG. 1B is a schematic, side view of a logging while drilling (LWD) environment 150. As discussed in further detail below, leak detector 118 of FIG. 1A can be deployed, for example, in wellbore 106 once the wellbore has been completed, i.e., cased or partially cased, to detect leaks along wellbore 106. In the embodiment of FIG. 1B, a hook 138, cable 142, traveling block (not shown), and hoist (not shown) are provided to lower a tool string 120 down the wellbore 106 or to pull the tool string 120 up from the wellbore 106. Tool string 120 may be a drill string, or another type of tool string operable to deploy leak detector 118. At wellhead 136, an inlet conduit 152 is coupled to a fluid source (not shown) to provide fluids, such as drilling fluids, downhole. The tool string 120 has an internal annulus that provides a fluid flow path from the surface 108 down to the leak detector 118. Tool string 120 is coupled to leak detector 118, which in the embodiment of FIG. 1B, includes physical sensor 122. The fluids travel down the tool string 120, and exit tool string 120 at drill bit 124. The fluids flow back towards surface 108 through a wellbore annulus 148 and exit wellbore annulus 148 via an outlet conduit 164 where the fluids are captured in container 140. Physical sensor 122 is operable to detect the presence of leaks, such as first leak 132. In the examples of FIGS. 1A and 1B, first leak 132 represents a leak in cement sheath 126. As physical sensor 122 traverses along the longitudinal axis of wellbore 106, signals indicative of first leak 132 are detected (physical signals) by physical sensor 122.

Leak detector 118 can utilize beamforming techniques to determine a localized peak of the spatial spectrum, where the localized peak is indicative of the location of the first leak 132. Examples of the beamforming techniques include traditional beamforming, Capon's beamforming, MUSIC, parametric analysis, azimuthal analysis, and similar techniques to determine the localized peak. As discussed in further detail below, leak detector 118 can also be configured to suppress roadnoise generated from movement of tool string 120 within well 102, for example, by adjusting one or more beamformer weights.

Although the leak detector 118 has been described thus far as operable to perform the operations described in the foregoing paragraphs, in one or more embodiments the foregoing operations may also be wholly or partially performed by other surfaced based or downhole electronic devices communicatively connected to the leak detector 118 and operable to receive the physical signals detected by the physical sensor 122. For example, controller 184, which is formed by one or more electronic devices, is operable to receive the detected physical signals and to perform the foregoing operations to compute a spatial spectrum indicative of the location of the first leak 132. Further, although FIGS. 1A and 1B illustrate the leak detector 118 and the sensor 122 deployed in two exemplary environments, the leak detector 118 and the sensor 122 may be deployed in various drilling, completion, and production environments. Further, although FIGS. 1A and 1B illustrate the leak detector 118 having one sensor 122, in some embodiments, the leak detector 118 is operable to utilize measurements obtained by multiple sensors (not shown) to perform operations described herein to obtain a plurality of virtual sensors, synchronize virtual signals of the plurality of virtual sensors, and to compute a spatial spectrum indicative of a location of the first leak 132 or another leak in the wellbore 106 based on the synchronized virtual signals.

Figure 2:
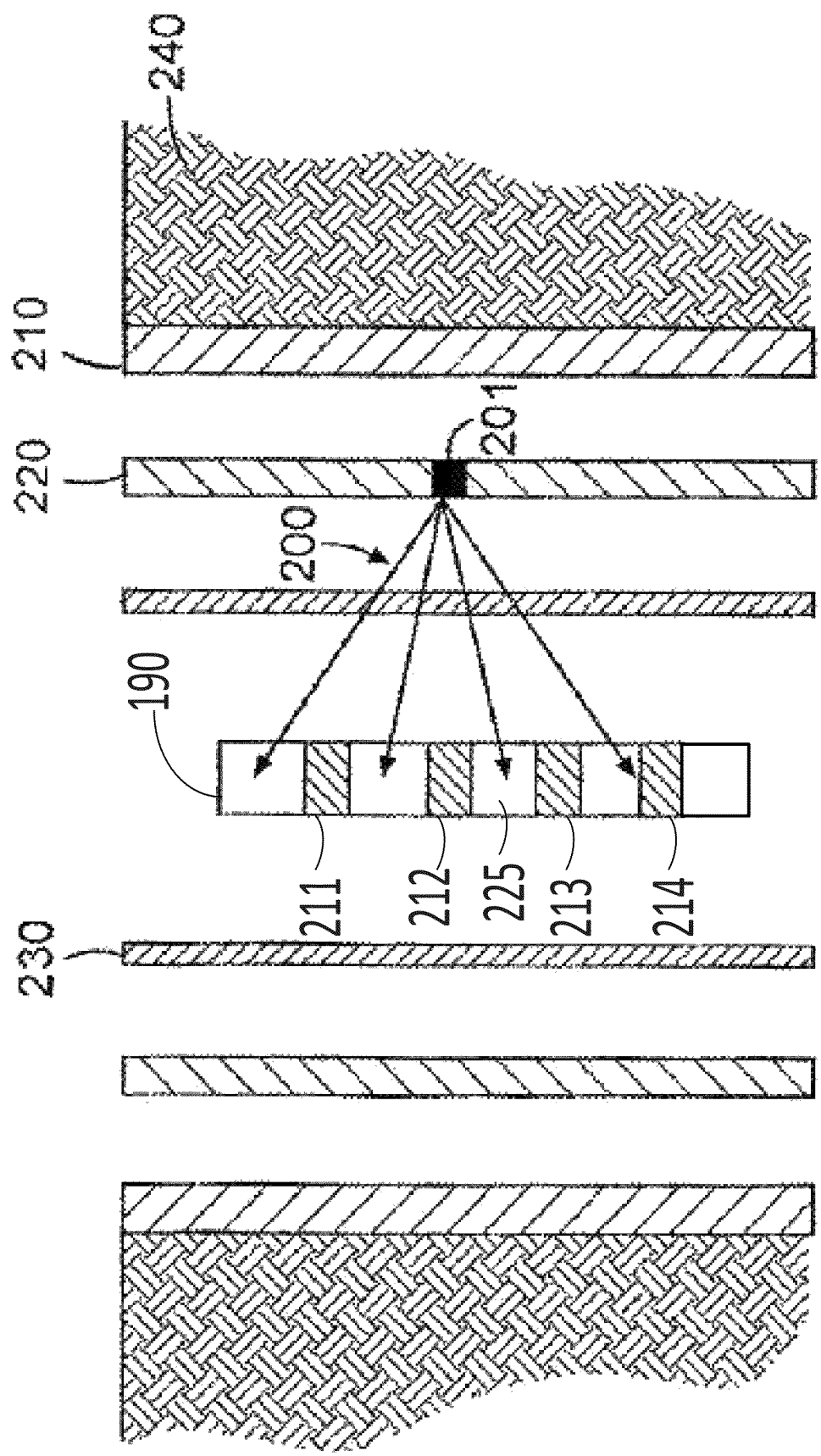
FIG. 2 is a cross-sectional diagram of a cased borehole in a geological formation including an acoustic tool, according to various examples of the disclosure.

FIG. 2 is a cross-sectional diagram of a cased borehole in a geological formation including an acoustic tool 190, according to various examples of the disclosure. Tool 190 of FIG. 2 is for purposes of illustration only as other acoustic tools may be used with the subsequently described methods to achieve substantially similar results. Tool 190 includes a plurality of acoustic sensors (e.g., hydro-phones) 211-214 that have the ability to receive audio signals (e.g., waves, data) from an acoustic source (e.g., fluid leak).

Each sensor 211-214 is able to independently received an acoustic wave or data and transmit the resulting signal to a control circuit (not illustrated). The control circuitry may be located downhole and/or on the surface. Processing of the signal, as described herein, may be accomplished downhole, on the surface, or portions of the processing split between downhole and the surface. The acoustic tool 190 may be located in a drill string tool housing to be used during a logging while drilling (LWD) measurement while drilling (MWD) operation or a wireline tool housing to be used during a wireline logging operation. Thus, the method used for transmitting the signals representing the received acoustic wave or data may vary depending on the environment. For example, the wireline embodiment may use a cable to transmit the signals to the surface while the drilling embodiment may use some form of telemetry (e.g., mud pulse telemetry) to transmit the signals to the surface. The acoustic tool 190 is shown with a linear array of acoustic sensors 211-214. Other embodiments may use other forms of acoustic sensor arrays 211-214 that are not arranged in a linear orientation. An approximate center location 225 of the acoustic tool 190 is shown and may be defined as a location on the tool 190 where a substantially equal number of sensors 211-214 are above the center location 225 as are below the center location 225. This center location 225 is used subsequently in the execution of an example of the method for downhole acoustic source localization.

In the cross-sectional wellbore environment illustrated in FIG. 2, geological formation 240 has been drilled and cased with a pipe 220 (i.e., casing). The gap between the formation edge 210 and the casing 220 may be filled with concrete and/or a fluid. The acoustic tool 190 may be located within another concentric pipe 230 within pipe 220. A fluid (e.g., liquid, gas) leak 201 (i.e., acoustic source) is shown in the pipe 220. The fluid leak 201 may result in acoustic waves 200 being emitted by the leak 201. The fluid leak 201 in the pipe 220 is shown only for purposes of illustration as any fluid flow source that generates acoustic waves 200 (i.e., acoustic wave source) may be used by an example of the method for downhole acoustic source localization.

In water, an acoustic wavelength is multiple inches or longer for frequencies of 30 kHz or less. In contrast, a wall thickness of a casing may be measured in approximately fractional inches. Since the acoustic wavelength is considerably larger than the wall thickness of pipe 230, acoustic waves can propagate through the walls of pipe 230, even at incident angles larger than the critical angle. In other words, it can be assumed that the wall of pipe 230 between the acoustic source at leak 201 and sensor array 211-214 introduces relatively little acoustic interference to the wave propagation. Thus, beamforming methods may be used to localize the source directly. On the other hand, since the acoustic wavelength is at the same order of the pipe diameter, the acoustic wave field will excite natural frequencies of the pipe 230 and, thus, generate resonant waves inside the pipe 230. Such resonant waves should be filtered out for acoustic source localization of leak 201.

Figure 3A:
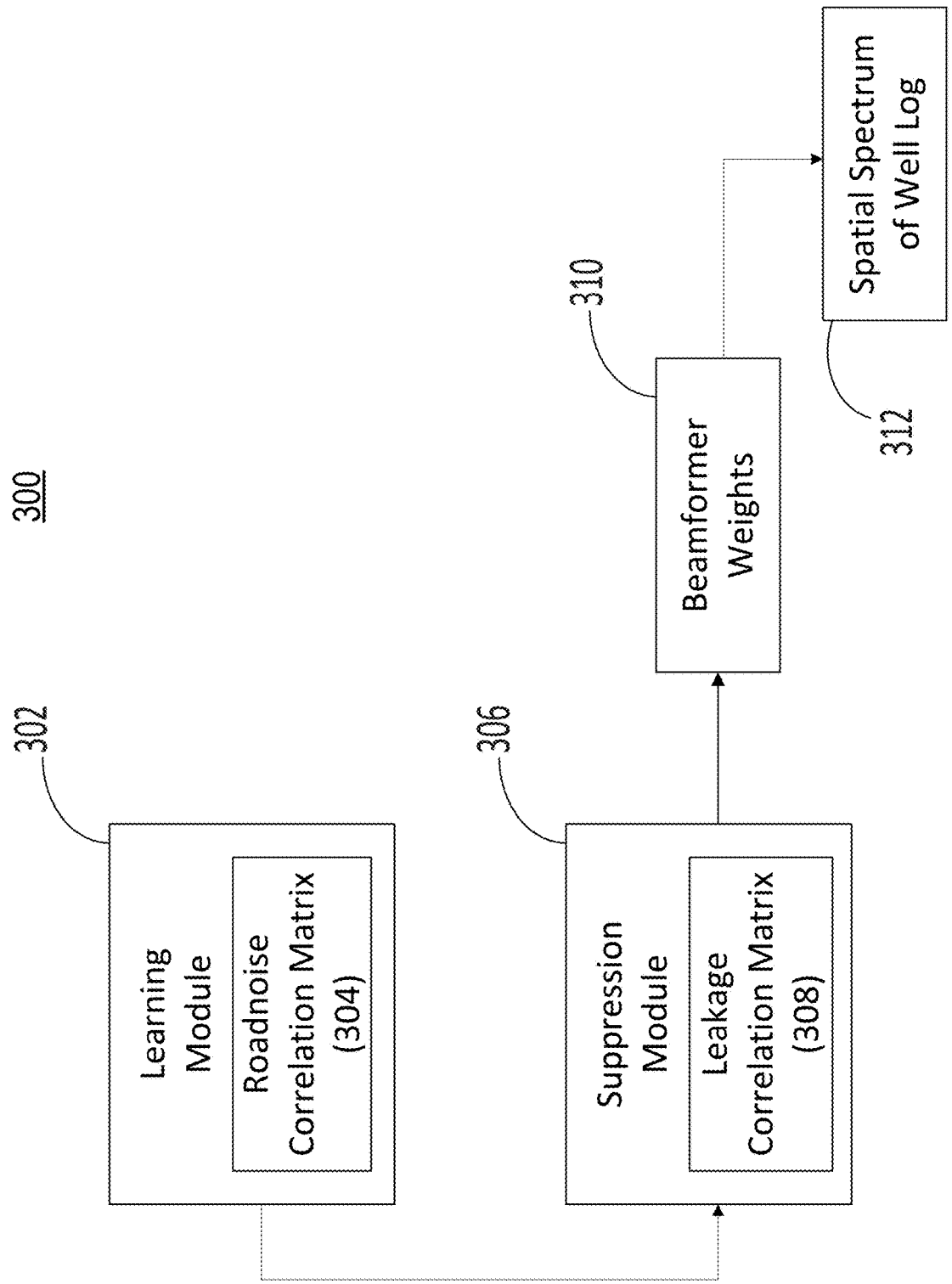
FIG. 3A is a block diagram of an example roadnoise rejection system, according to some aspects of the disclosed technology.

FIG. 3A is a block diagram of a roadnoise suppression system 300 that can be employed to reduce roadnoise in a wellbore environment, according to some aspects of the disclosed technology. Roadnoise suppression system 300 includes a roadnoise learning model 302 that is configured to learn and model roadnoise present in a wellbore environment. Roadnoise learning module 302 can be provided with training data, for example, that represents exemplary acoustic noise signals that are present in a wellbore environment. By way of example, the acoustic training data may include audio recordings extracted from a leakage localization array run, for example, when up-logging and/or down-logging operations are performed. Depending on the desired implementation, recorded acoustic training data may be captured in a laboratory setting and/or from real-world tool operations. In some aspects, roadnoise learning may be performed using specific tool configurations or under specific environmental conditions, such that roadnoise learning is performed in scenarios similar to that of an intended deployment of the suppression system 300.

Using example roadnoise signals (training data), learning module 302 can generate a roadnoise model that can be used to detect and eliminate/suppress unwanted acoustic artifacts arising from tool operation in the wellbore. In some approaches, the roadnoise model generated by learning module 302 may include a roadnoise correlation matrix 304 that can be used by suppression module 306 to perform acoustic suppression. In some approaches, suppression module 306 is configured to adapt one or more beamformer weights (e.g., using a leakage correlation matrix 308) to facilitate leak detection in a wellbore environment. By combining leak detection using leakage correlation matrix 308) with roadnoise correlation matrix 304, suppression module 306 can be configure to design/calibrate beamformer weights 310 that are used to produce a special spectrum log 312 of a wellbore environment.

Figure 3B:
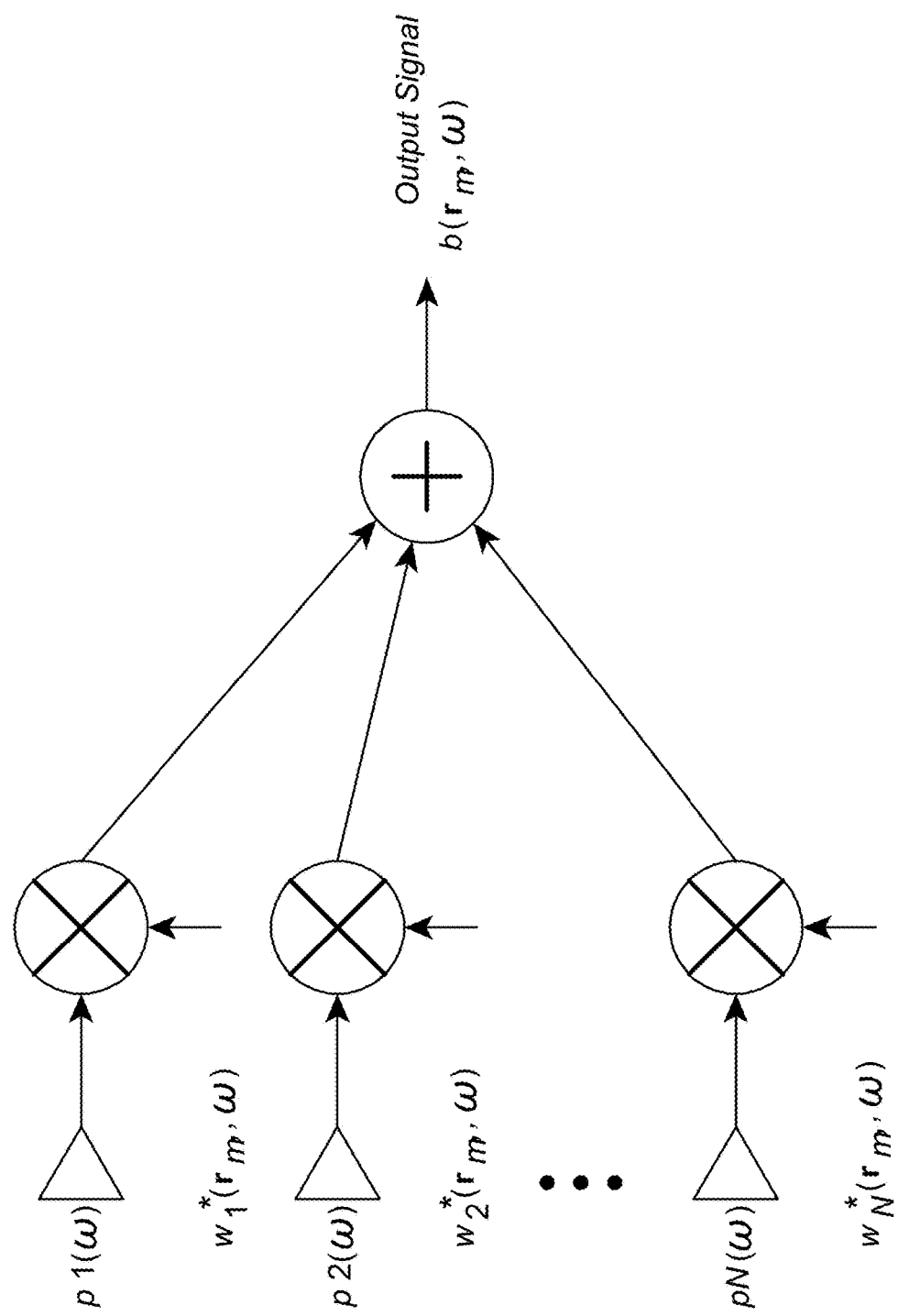
FIG. 3B is an example beamforming system that can be used to suppress roadnoise, according to some aspects of the disclosed technology.

FIG. 3B illustrates an example beamforming system 301 that can be used to suppress roadnoise, according to some aspects of the disclosed technology. The beamformer 301 of FIG. 3B comprises a uniform linear array (ULA) of N hydrophones. In this example, $p_n(\omega)$ denotes a measured complex pressure field at angular frequency $\omega$. As such, the array measurement can be expressed in the vector form of equation (1):

$$p(\omega)=[p_1(\omega) \ldots p_N(\omega)]^T, \quad (1)$$

with the beamformer power expressed by equation (2):

$$\beta(r_m,\omega)=E\{|b(r_m,\omega)|^2\}w^H(r_m,\omega)R(\omega)w(r_m,\omega), \quad (2)$$

wherein E stands for the expected value of the expression, H stands for the Hermitian transpose of the matrix, and w stands for a complex vector of beamformer weights, where an expected value of the hydrophone sensor correlation matrix (R) is provided by equation (3):

$$R(\omega)=E\{p(\omega)p^H(\omega)\} \quad (3)$$

In some aspects, the measured pressure field contains both the leakage located at, road noise, and noise. Consequently, equation (1) can be modeled using equation (4)

$$p(\omega)=S_s(\omega)a(r_s,\omega)+\Sigma_{i=1}{}^I s_i(\omega)a(r_i,\omega)+q(\omega) \quad (4)$$

where $S_s(\omega) \in C$, and $a(r_s, \omega) \in C^N$ are complex pressure fields of the source and transfer function from location $r_s$ to the hydrophone array, respectively. $S_i(\omega) \in C$, and $a(r_i, \omega) \in C^N$ are the complex pressure fields of the ith roadnoise. C represents the complex domain of dimension −1 (i.e. it is a complex-scalar). $C^N$ represents the complex domain of dimension −N (i.e [a1, a2, . . . , aN]). The transfer function of the ith roadnoise located at $r_i \cdot q(\omega) \sim N(0, \sigma_q^2)$ captures the spatial and temporal noise.

Assuming the source, interference, and noise are uncorrelated, equation (4) can be substituted into equation (3) to arrive at the following model for the hydrophone correlation matrix, provided by equation (5):

$$\begin{aligned} R(\omega) &= E\{p[\omega]p^H(\omega)\}, \\ &= a(r_s, \omega)s_s(\omega)a^H(r_s, \omega) + [a(r_1, \omega) \ldots a(r_1\omega)] \\ &\quad \begin{bmatrix} S_1(\omega) & \ldots & 0 \\ \vdots & \ddots & \vdots \\ 0 & \ldots & s_1(\omega) \end{bmatrix} [a(r_1, \omega) \ldots a(r_1, \omega)]^H + \sigma_q^2 I_N, \\ &= R_s(\omega) + R_I(\omega) + \sigma_q^2 I_N, \end{aligned} \quad (5)$$

where $R_s(\omega)$ represents the source correlation matrix, $R_I(\omega)$ represents an interference correlation matrix, $\sigma_q^2$ represents the power of the road noise $q(\omega)$, $\alpha_q^2 I_N$ represents the noise correlation matrix, and $I_N$ is the N×N identity matrix. Wherein, a(r,w) represents the hydrophone array manifold, R is the location of the acoustic source representing the leak, w is the angular frequency of the source, a(.,.) can be abstractly modeled as a complex exponential (i.e. exp(−j*w*r) capturing the angular phase of the acoustic source representing the leak). In equation (5) correlation matrix R(ω) comprises contributions from three components.

Additionally, equation (3) can also be compactly represented as equation (6):

$$R(\omega)=E\{p(\omega)p^H(\omega)\},$$

$$=A(r_s,r_1,\ldots,r_1|\omega)S(\omega)A^H(r_s,r_1|\omega)+\sigma_q^2 I_N \quad (6)$$

where $$A(r_s, r_1, \ldots r_1) = [a(r_s, \omega) | a(r_1, \omega) \ldots a(r_1, \omega)] \in C^{N\times(1+I)}, \quad (8)$$

$$S(\omega) = \begin{bmatrix} s_s(\omega) & 0 & \ldots & 0 \\ 0 & s_1(\omega) & \ldots & 0 \\ \vdots & \vdots & \ddots & \vdots \\ 0 & 0 & \ldots & s_1(\omega) \end{bmatrix} \in C^{(1+I)\times(1+I)}$$

Using equation (5), the beamformer power at location $r_m$ is provided by equation (9):

$$\beta(r_m,\omega)=w^H(r_m,\omega)R(\omega)w(r_m,\omega),$$

$$=w^H(r_m,\omega)[R_s(\omega)+R_{I+q}(\omega)]w(r_m,\omega), \quad (9)$$

Where $R_{I+q}(\omega)$ contains both the interference plus noise correlation matrix. In some implementations, it is desirable to configure the beamformer weight $w(r_m, \omega)$ to minimize the contribution from the interference plus noise correlation matrix, while maintaining nominal power from the source correlation matrix. Mathematically, this can be formulated as the following optimization problem, provided by the expression of equation (10):

$$\min_{w\in C^N} w^H(\omega)R_{I+q}(\omega)w(\omega), \quad w^H(\omega)a(r_s, \omega) = 1. \quad (10)$$

Forming the Lagrange of equation (10) and solving it using the Lagrangian multiplier approach, arrives at the following optimal weight provided by equation (11):

$$w_{opt} = \frac{R_{I+q}^{-1}(\omega)a(r_s, \omega)}{a^H(r_s, \omega)R_{I+q}^{-1}(\omega)a(r_s, \omega)} \quad (11)$$

Notice that $w_{opt}$ in equation (11) is now a function of roadnoise correlation matrix $R_{I+q}(\omega)$.

Also, from equation (11), it can be seen that optimal weight $w_{opt}$ is a function of $r_s$, the source location, which is usually unavailable. Nonetheless, this can be easily overcome by designing a set of grid space R={$r_1, \ldots, r_m, \ldots, r_M$} that relates to the $w_{opt}$ at each location $r_m$, i.e. equation (12):

$$w_{opt}(R_{1+q}, r_m, \omega) = \frac{R_{I+q}^{-1}a(r_m, \omega)}{a^H(r_m, \omega)R_{I+q}^{-1}a(r_m, \omega)} \quad (12)$$

Accordingly, the spatial power spectrum at location $r_m$, can be computed with the beamformer power provided by equation (13), as:

$$\beta(R_{I+q},r_m,\omega)=w_{opt}^H(R_{I+q},r_m,\omega)R(\omega)w_{opt}(R_{I+q},r_m,\omega) \quad (13)$$

which after computing for all elements of $r_m \in R$ it can be used to localize the location of wellbore leakages with the roadnoise and noise suppressed, i.e. the location of the leakage without roadnoise can be found as the argument that maximizes equation (13) using the expression of equation (14):

$$\hat{r}_s = \underset{r_m \in R}{\text{argmax}} \sum_{\ell=1}^{L} \beta(R_{I+q}, r_m, \omega_\ell) \quad (14)$$

Figure 4A:
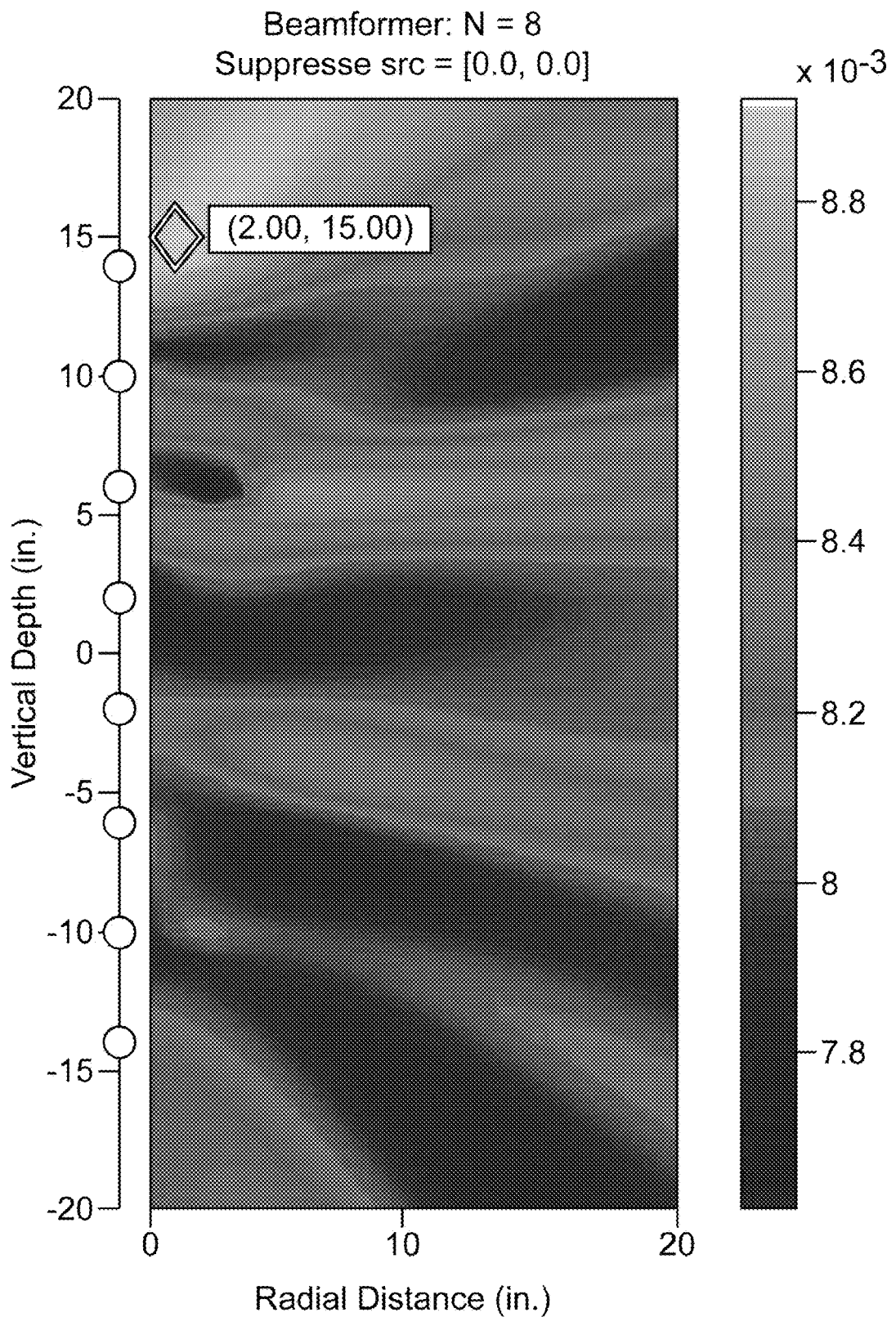
FIG. 4A illustrates an example graph of beamformer power without roadnoise suppression.
Figure 4B:
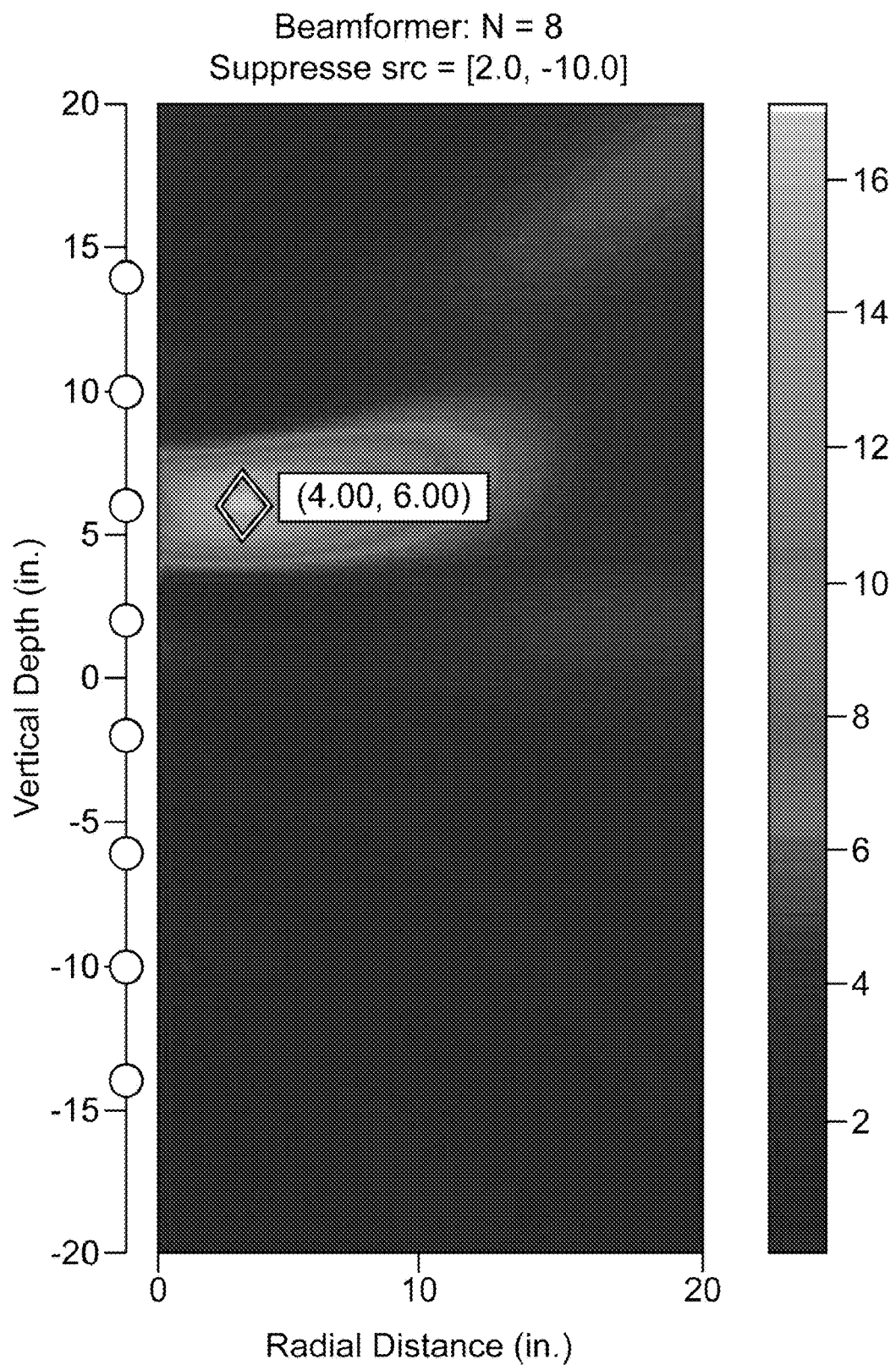
FIGS. 4B and 4C illustrate example graphs of beamformer power when one source is treated as interference, while the other is treated as a source signal.
Figure 4C:
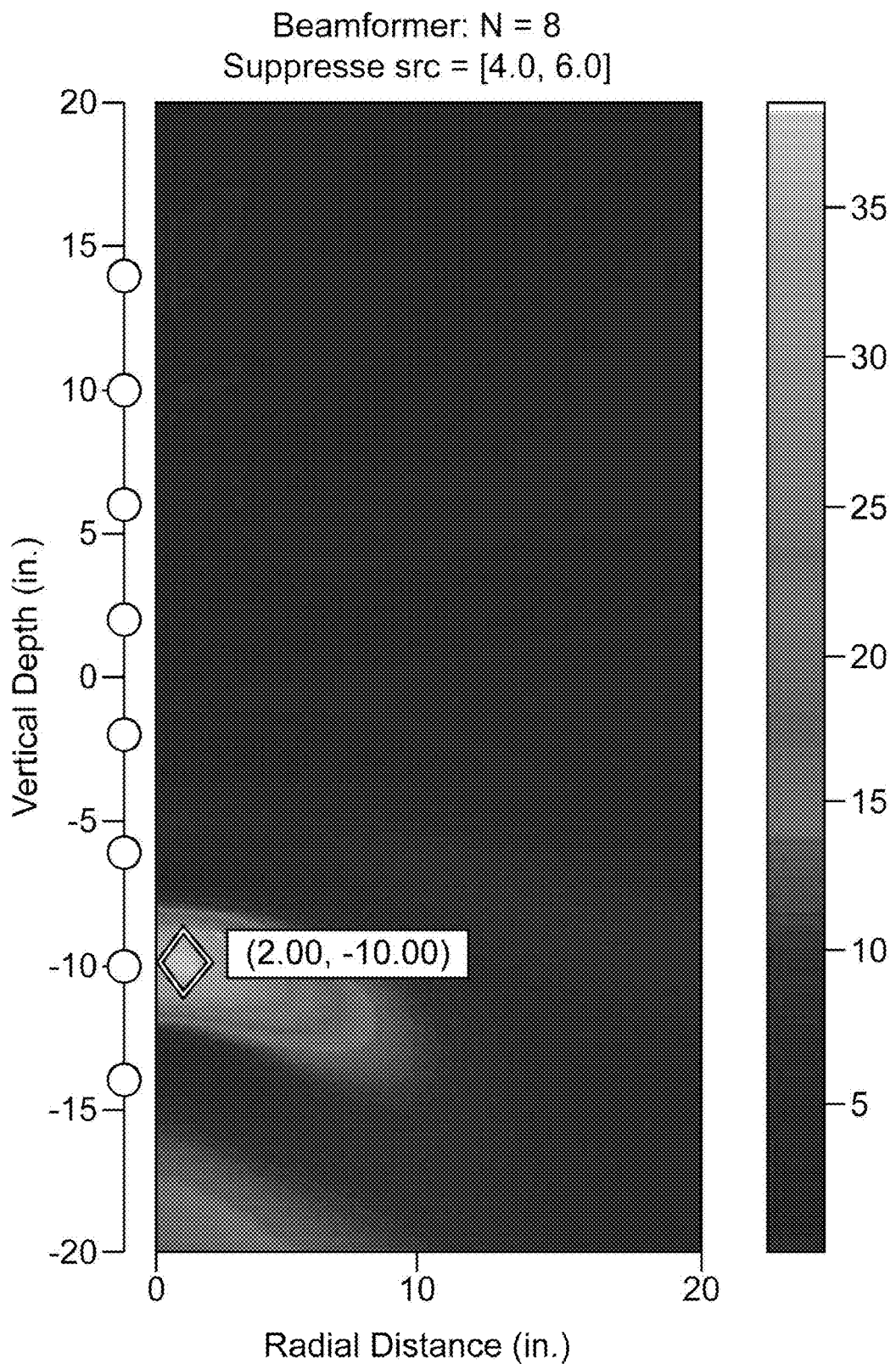

FIGS. 4A, 4B, and 4C graphically illustrate the effect of a roadnoise suppression process according to some aspects of the invention. In both simulations, an array of N=8 sensors, submerged in water with acoustic propagation speed c=59055 in/sec, were used, with two sources located at $r_1=[+04, +06]^T$ inch and $r_2[+02, -10]T$, respectively.

In particular, FIG. 4A shows the beamformer power without the proposed roadnoise suppression approach. As clearly evident, the beamformer power fails to resolves the two sources. This simulation highlights the detrimental effect of multiple sources in the beamformer power.

FIGS. 4B and 4C illustrate example graphs of beamformer power when one source is treated as interference, while the other is treated as a source signal. It can be observed in this situation that the source has been clearly resolved. This illustrates the strength of using the proposed suppression method in the event of leakages and roadnoise.

Figure 5A:
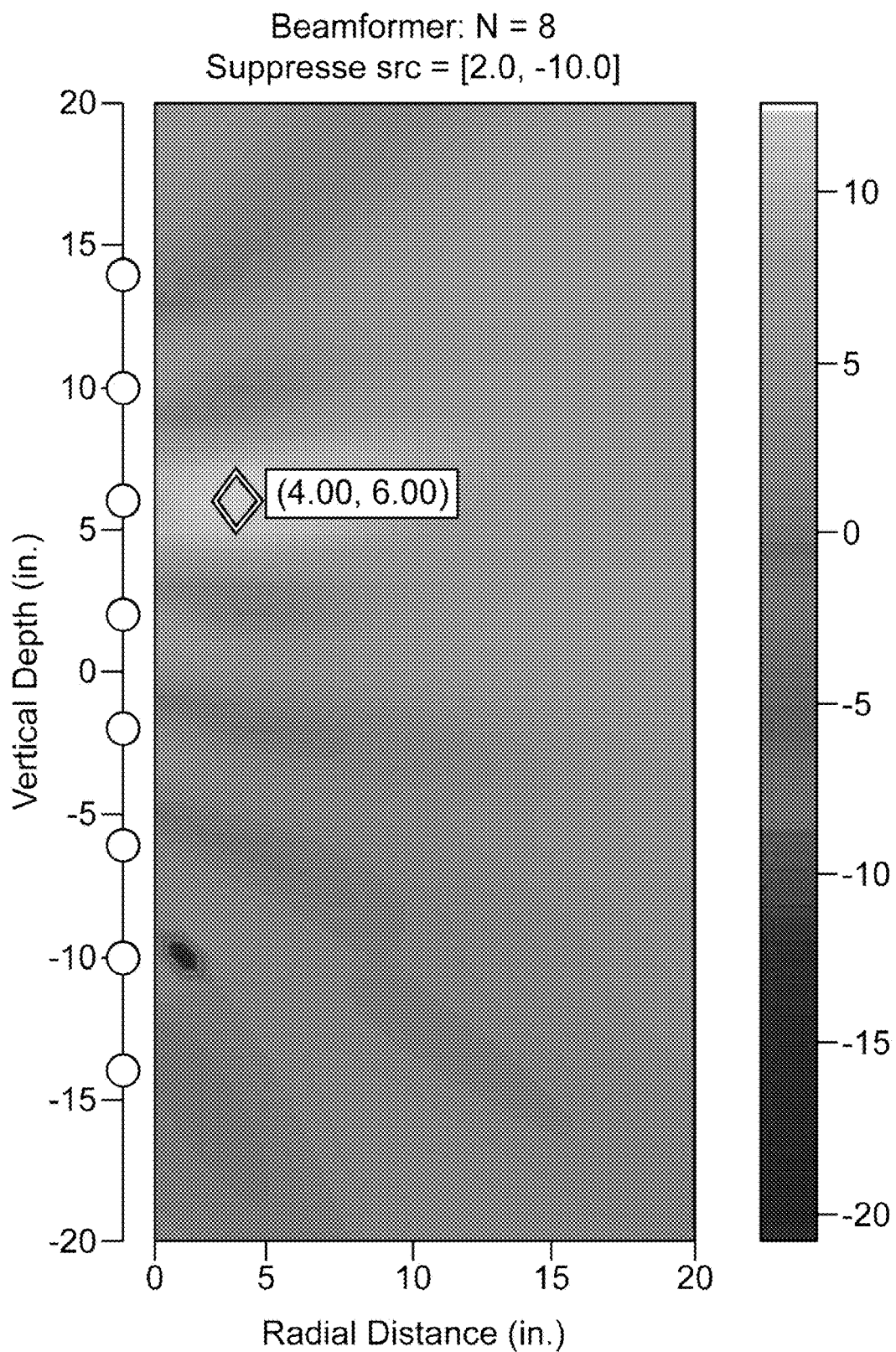
FIGS. 5A and 5B illustrate example graphs of beamformer power (in dB) when one source is treated as interference, while the other is treated as a source signal.
Figure 5B:
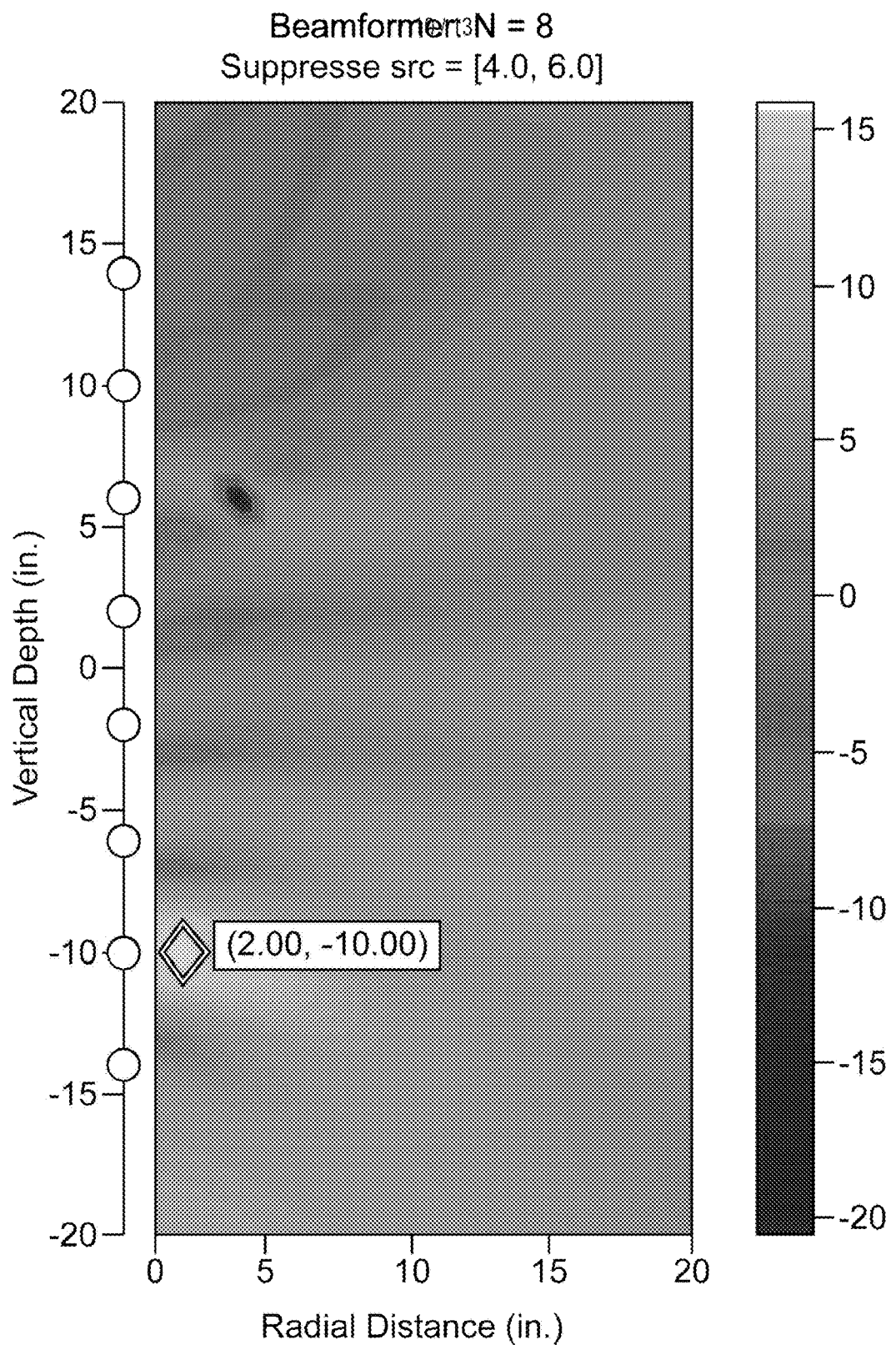

FIGS. 5A and 5B illustrate example graphs of beamformer power (in dB) when one source is treated as interference, while the other is treated as a source signal. As can be seen in FIGS. 5A/B, the suppressed beamformer power response is approximately −20 dB. This implies that the source at the suppressed location has been effectively rejected.

Depending on the desired implementation, the roadnoise suppression process can be applied in-field, i.e., to active wellbores. In such implementations, collected field data can be subject to the following assumptions: (A) roadnoise is wide-sense-stationary across the depth recording; (B) the recording noise is temporally and spatially white, i.e., it is uncorrelated to the roadnoise and leakage signal; and (C) leakage occurrence is sparse, i.e. most of the recordings are roadnoise.

The significant of the assumptions are as follows: assumption (A) implies that the correlation matrix of the roadnoise remains unchanged over the various depth snapshot recordings. This suggests that the roadnoise correlation matrix $R_{I+q}(\omega)$ can be approximated by finding the average correlation matrix across the depth, i.e. $R_{I+q}(\omega) \approx \mathbb{E}\{R(\omega)\}_{depth}$. Assumption (B) implies that the cross correlation terms will not occur in the beamformer power. Lastly, assumption (C) together with assumption (A) imply that the average correlation matrix will approach the roadnoise instead of the leakage.

By way of example, a roadnoise correlation matrix $\hat{R}_{I+q}(\omega)$ is approximated using all the collected recording over a variety of depth positions, for example, from 1 to 300. At each depth position, the set of model steering vectors $a(r_m, \omega)$, as well as the approximated roadnoise correlation matrix $\hat{R}_{I+q}(\omega)$ are used to design the optimal weight $w_{opt}(\hat{R}_{I+q}(\omega), r_m)$. Finally, the beamformer power is calculated using equation (14), discussed above (13).

Figure 6B:
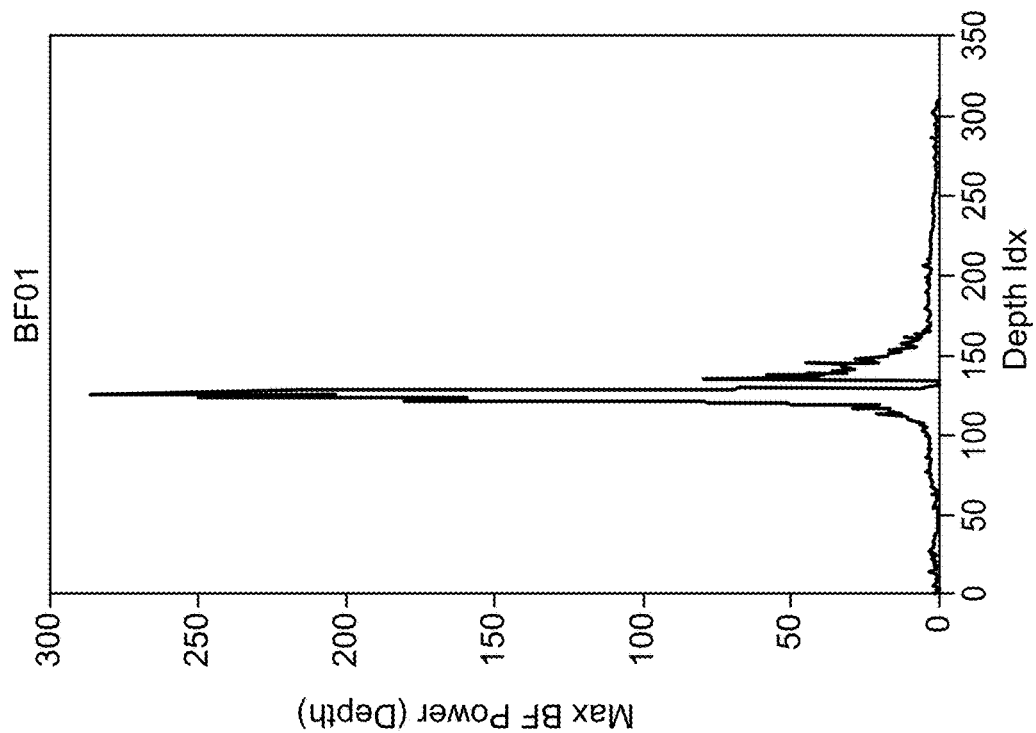
FIG. 6B illustrates a graphical example of beamformer power with suppression.
Figure 6A:
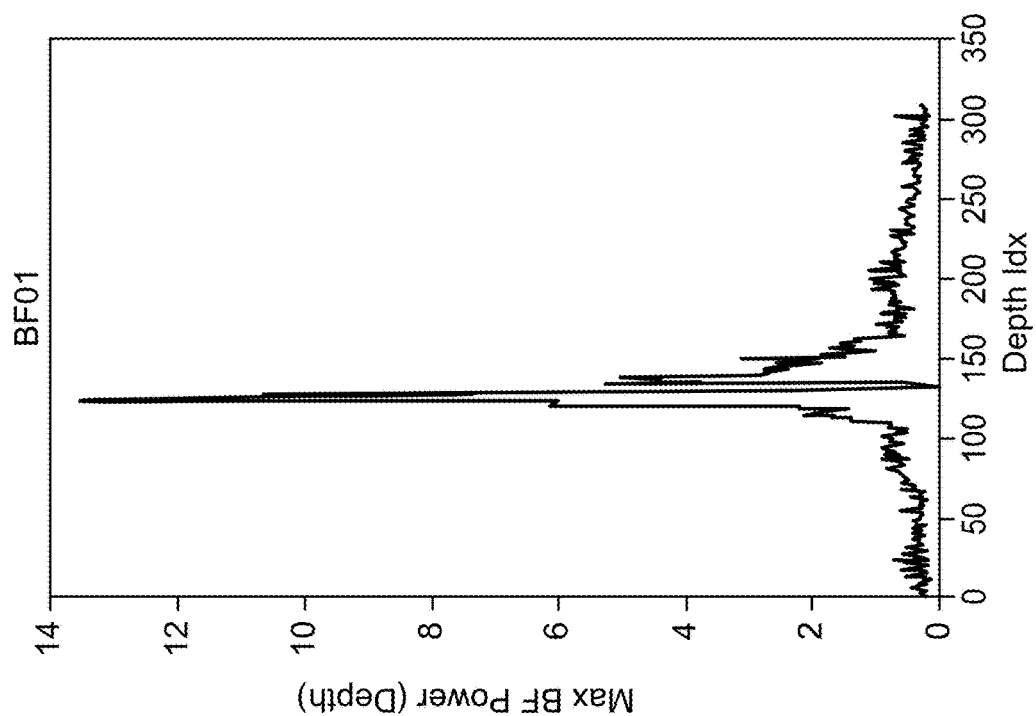
FIG. 6A illustrates a graphical example of beamformer power without suppression.

FIGS. 6A and 6B illustrate a graphical examples of beamformer power without suppression (FIG. 6A), and with power suppression (FIG. 6B), respectively. In particular, FIGS. 6A and 6B provide a side-by-side comparison of the maximum beamformer power at each depth recording. In this example, the recording with N=6 sensors, sampled at $F_s$=500 kHz, is transformed into the frequency domain with NFFT=2048 Bins. Only the frequencies between 5-10 kHz are used for beamforming. FIGS. 6A and 6B show the maximum beamformer magnitude, $\beta_{max}$(depth), across the various depth recording using the normal ACX algorithm and the proposed approach respectively. It can be seen that most of the $\beta_{max}$(depth) across the depths using the proposed method are suppressed as (lower magnitude) as compared to the normal ACX algorithm.

Figure 7:
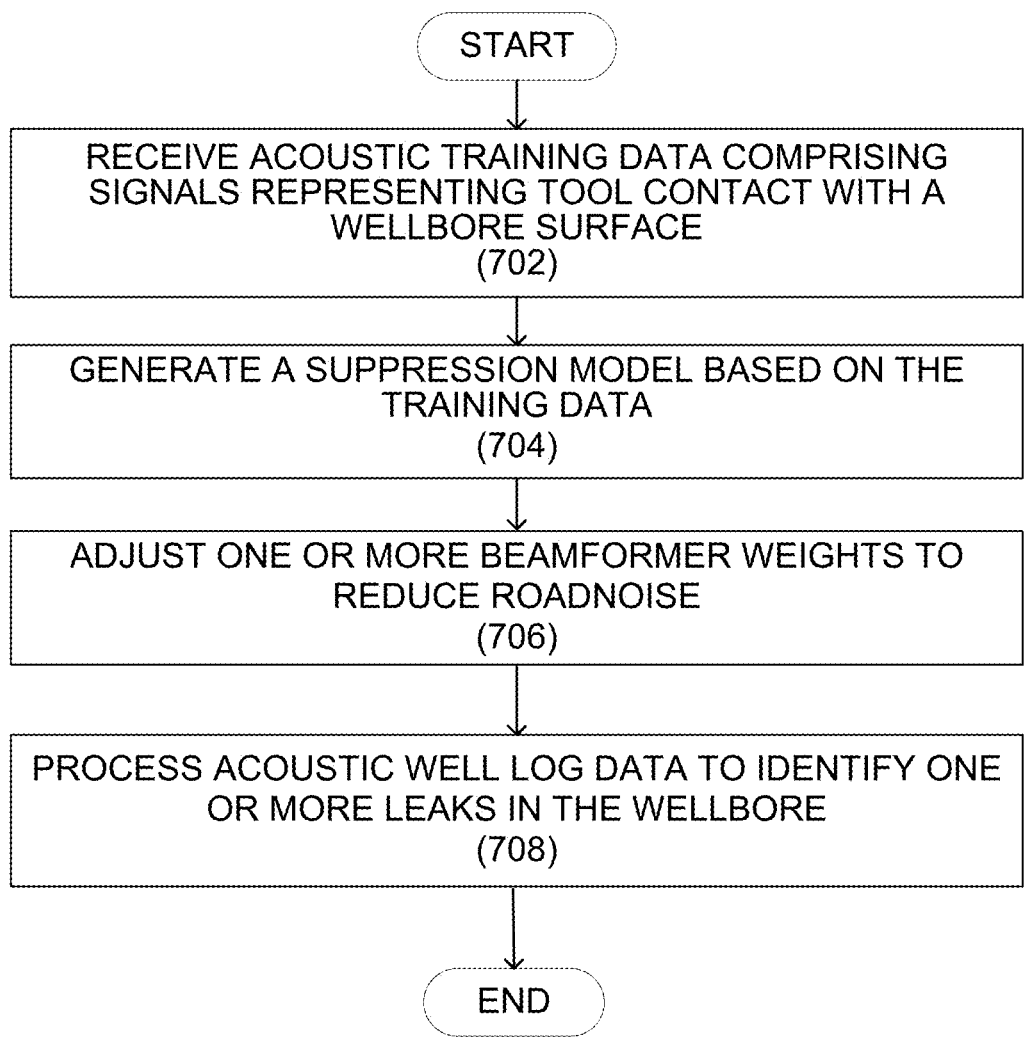
FIG. 7 illustrates steps of an example process for performing roadnoise suppression, according to some aspects of the disclosed technology.

FIG. 7 illustrates steps of an example process 700 for performing roadnoise suppression, according to some aspects of the disclosed technology. Process 700 begins with step 702 in which acoustic training data is received, for example, by a learning module 302 of suppression system 300 discussed above with respect to FIG. 3. As discussed above, training data can include acoustic signals that represent roadnoise in a wellbore, such as acoustic signals generated by tool contact with an interior surface of the wellbore environment. In some aspects, training data may be obtained in-field from an actual wellbore site, such as a customer wellbore.

In step 704, a suppression model is generated based on the training data. The suppression model can include a roadnoise correlation matrix; however, it is understood that other suppression models may be used, including but not limited to those generated using machine-learning implementations, without departing from the scope of the disclosed technology.

In step 706, one or more beamformer weights are adjusted based on the suppression model. In some aspects, beamformer weight selection is informed by the roadnoise correlation matrix, as well as a leakage correlation matrix that can be used to detect leaks in the wellbore. Choosing beamformer weights based on the roadnoise and leakage detection matrices can help eliminate roadnoise components of the acoustic signals received while performing leak detection in the wellbore.

In step 708, acoustic well log data is processed to identify one or more leaks in the wellbore. As discussed above, the acoustic well log data can be improved by reducing extraneous noise signals (e.g., roadnoise) from received acoustic well log data.

Figure 8:
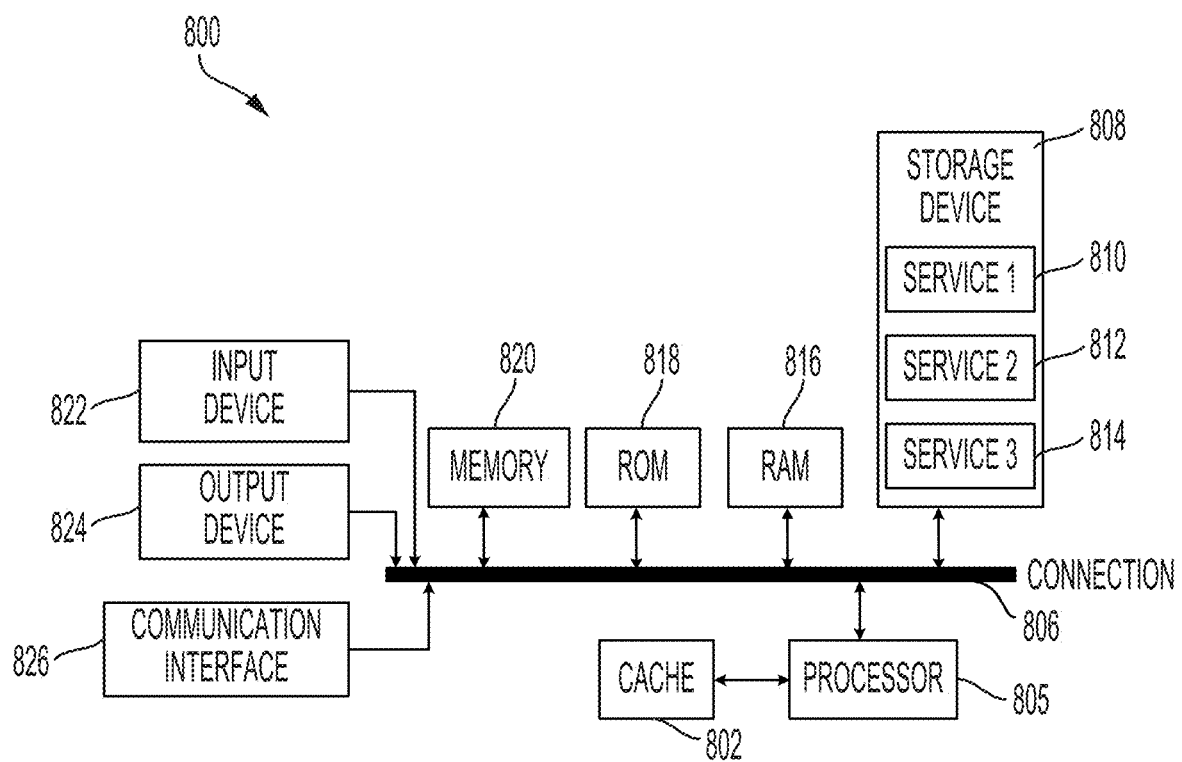
FIG. 8 is a schematic diagram of an example system embodiment.

FIG. 8 illustrates an exemplary computing system for use with example tools and systems. The more appropriate embodiment will be apparent to those of ordinary skill in the art when practicing the present technology. Persons of ordinary skill in the art will also readily appreciate that other system embodiments are possible.

Specifically, FIG. 8 illustrates system architecture 800 wherein the components of the system are in electrical communication with each other using a bus 806. System architecture 800 can include a processing unit (CPU or processor) 805, as well as a cache 812, that are variously coupled to system bus 806. Bus 806 couples various system components including system memory 815, (e.g., read only memory (ROM) 820 and random access memory (RAM) 835), to processor 805. System architecture 800 can include a cache of high-speed memory connected directly with, in close proximity to, or integrated as part of the processor 805. System architecture 800 can copy data from the memory 815 and/or the storage device 830 to the cache 812 for quick access by the processor 805. In this way, the cache can provide a performance boost that avoids processor 805 delays while waiting for data. These and other modules can control or be configured to control the processor 805 to perform various actions. Other system memory 815 may be available for use as well. Memory 815 can include multiple different types of memory with different performance characteristics. Processor 805 can include any general-purpose processor and a hardware module or software module, such as module 1 (832), module 2 (834), and module 3 (836) stored in storage device 830, configured to control processor 805 as well as a special-purpose processor where software instructions are incorporated into the actual processor design. Processor 805 may essentially be a completely self-contained computing system, containing multiple cores or processors, a bus, memory controller, cache, etc. A multi-core processor may be symmetric or asymmetric.

To enable user interaction with the computing system architecture 800, input device 845 can represent any number of input mechanisms, such as a microphone for speech, a touch-sensitive screen for gesture or graphical input, keyboard, mouse, motion input, and so forth. An output device 842 can also be one or more of a number of output mechanisms. In some instances, multimodal systems can enable a user to provide multiple types of input to communicate with the computing system architecture 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 835, read only memory (ROM) 820, and hybrids thereof.

Storage device 830 can include software modules 832, 834, 836 for controlling the processor 805. Other hardware or software modules are contemplated. The storage device 830 can be connected to the system bus 806. In one aspect, a hardware module that performs a particular function can include the software component stored in a computer-readable medium in connection with the necessary hardware components, such as the processor 805, bus 806, output device 842, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Statements of the Disclosure

Statement 1: a method for performing acoustic leak detection, comprising: receiving acoustic training data, wherein the acoustic training data comprises signals representing acoustic tool contact with a wellbore surface, and generating a suppression model based on the acoustic training data, wherein the suppression model is configured to suppress roadnoise received at a hydrophone array disposed within the wellbore.

Statement 2: the system of statement 1, further comprising: adjusting one or more beamformer weights to reduce roadnoise received by the hydrophone array.

Statement 3: the method of any of statements 1-2, further comprising: logging acoustic well log data from the wellbore using the hydrophone array, and processing the acoustic well log data to identify one or more leaks in a casing within the wellbore.

Statement 4: the method of any of statements 1-3, wherein processing the acoustic well log data is performed using a leakage correlation matrix.

Statement 5: the method of any of statements 1-4, wherein processing the acoustic well log data is performed using a leakage correlation matrix.

Statement 6: the method of any of statements 1-5, wherein the roadnoise comprises down-logging roadnoise.

Statement 7: the method of any of statements 1-6, wherein the suppression model comprises a roadnoise correlation matrix.

Statement 8: a system for suppressing roadnoise, the system comprising: one or more processors, and a non-transitory memory coupled to the one or more processors, wherein the memory comprises instruction configured to cause the processors to perform operations for: receiving acoustic training data, wherein the acoustic training data comprises signals representing acoustic tool contact with a wellbore surface, and generating a suppression model based on the acoustic training data, wherein the suppression model is configured to suppress roadnoise received at a hydrophone array disposed within the wellbore.

Statement 9: the system of statement 8, wherein the instructions are further configured to cause the processors to perform operations comprising: adjusting one or more beamformer weights to reduce roadnoise received by the hydrophone array.

Statement 10: the system of any of statements 8-9, wherein the instructions are further configured to cause the processors to perform operations comprising: logging acoustic well log data from the wellbore using a hydrophone array, and processing the acoustic well log data to identify one or more leaks in a casing within the wellbore.

Statement 11: the system of any of statements 9-10, wherein processing the acoustic well log data is performed using a leakage correlation matrix.

Statement 12: the system of any of statements 9-11, wherein the roadnoise comprises up-logging roadnoise.

Statement 13: the system of any of statements 9-12, wherein the roadnoise comprises down-logging roadnoise.

Statement 14: the system of any of statements 9-13, wherein the suppression model comprises a roadnoise correlation matrix.

Statement 15: a tangible, non-transitory, computer-readable media having instructions encoded thereon, the instructions, when executed by a processor, are operable to perform operations for: receiving acoustic training data, wherein the acoustic training data comprises signals representing acoustic tool contact with a wellbore surface, and generating a suppression model based on the acoustic training data, wherein the suppression model is configured to suppress roadnoise received at a hydrophone array disposed within the wellbore.

Statement 16: the tangible, non-transitory, computer-readable media of statement 15, adjusting one or more beamformer weights to reduce roadnoise received by the hydrophone array.

Statement 17: the tangible, non-transitory, computer-readable media of any of statements 15-16, wherein the instructions are further configured to cause the processors to perform operations for: processing acoustic well log data received from the hydrophone array to identify one or more leaks in a casing within the wellbore.

Statement 18: the tangible, non-transitory, computer-readable media of any of statements 15-17, wherein processing the acoustic well log data is performed using a leakage correlation matrix.

Statement 19: the tangible, non-transitory, computer-readable media of any of statements 15-18, computer-readable media of claim 15, wherein the roadnoise comprises up-logging roadnoise or down-logging roadnoise.

Statement 20: the tangible, non-transitory, computer-readable media of any of statements 15-19, computer-readable media of claim 15, wherein the suppression model comprises a roadnoise correlation matrix.

What is claimed is:

1. A method for performing acoustic leak detection, comprising:

receiving acoustic training data, wherein the acoustic training data comprises signals representing acoustic tool contact with a surface of a wellbore;

generating a roadnoise learning model including a roadnoise correlation matrix based on the acoustic training data and machine-learning implementations, wherein the roadnoise learning model is configured to learn and model roadnoise present in an environment of the wellbore, the roadnoise correlation matrix comprising an interference correlation matrix and a noise correlation matrix, and the roadnoise comprises noise generated by an acoustic tool when the acoustic tool drags against the surface;

logging acoustic well log data from the wellbore using a hydrophone array;

adjusting one or more beamformer weights to minimize contributions from the interference correlation matrix and the noise correlation matrix, while maintaining nominal power from a source correlation matrix, the adjusted one or more beamformer weights suppresses roadnoise included in the acoustic well log data; and processing the acoustic well log data to identify one or more leaks in a casing within the wellbore.

2. The method of claim 1, further comprising:

adjusting one or more beamformer weights to reduce roadnoise received by the hydrophone array.

3. The method of claim 1, wherein the roadnoise comprises up-logging roadnoise.

4. The method of claim 1, wherein the roadnoise comprises down-logging roadnoise.

5. A system for suppressing roadnoise, the system comprising:

one or more processors;

a hydrophone array coupled to the one or more processors; and a non-transitory memory coupled to the one or more processors, wherein the non-transitory memory comprises instructions configured to cause the one or more processors to perform operations for:

receiving acoustic training data, wherein the acoustic training data comprises signals representing acoustic tool contact with a surface of a wellbore;

generating a roadnoise learning model including a roadnoise correlation matrix based on the acoustic training data and machine-learning implementations, wherein the roadnoise learning model is configured to learn and model roadnoise present in a environment of the wellbore, the roadnoise correlation matrix comprising an interference correlation matrix and a noise correlation matrix, and the roadnoise comprises noise generated by an acoustic tool when the acoustic tool drags against the surface;

logging acoustic well log data from the wellbore using the hydrophone array;

adjusting one or more beamformer weights to minimize contributions from the interference correlation matrix and the noise correlation matrix, while maintaining nominal power from a source correlation matrix, the adjusted one or more beamformer weights suppresses roadnoise included in the acoustic well log data; and processing the acoustic well log data to identify one or more leaks in a casing within the wellbore.

6. The system of claim 5, wherein the instructions are further configured to cause the one or more processors to perform operations comprising:

adjusting one or more beamformer weights to reduce roadnoise received by the hydrophone array.

7. The system of claim 5, wherein the roadnoise comprises up-logging roadnoise.

8. The system of claim 5, wherein the roadnoise comprises down-logging roadnoise.

9. A tangible, non-transitory, computer-readable media having instructions encoded thereon, the instructions, when executed by a processor, are operable to perform operations for:

receiving acoustic training data, wherein the acoustic training data comprises signals representing acoustic tool contact with a surface of a wellbore;

generating a roadnoise learning model including a roadnoise correlation matrix based on the acoustic training data and machine-learning implementations, wherein the roadnoise learning model is configured to learn and model roadnoise present in an environment of the wellbore, the roadnoise correlation matrix comprising an interference correlation matrix and a noise correlation matrix, roadnoise comprises noise generated by an acoustic tool when the acoustic tool drags against the surface;

logging acoustic well log data from the wellbore using a hydrophone array;

adjusting one or more beamformer weights to minimize contributions from the interference correlation matrix and the noise correlation matrix, while maintaining nominal power from a source correlation matrix, the adjusted one or more beamformer weights suppresses roadnoise included in the acoustic well log data; and processing the acoustic well log data to identify one or more leaks in a casing within the wellbore.

10. The tangible, non-transitory, computer-readable media of claim 9, wherein the instructions are further configured to cause the processor to perform operations for:

adjusting one or more beamformer weights to reduce roadnoise received by the hydrophone array.

11. The tangible, non-transitory, computer-readable media of claim 9, wherein the roadnoise comprises up-logging roadnoise or down-logging roadnoise.

* * * * *